(12) United States Patent
Jagadeesan et al.

(10) Patent No.: US 12,260,649 B2
(45) Date of Patent: Mar. 25, 2025

(54) DETERMINING INCORRECT PREDICTIONS BY, AND GENERATING EXPLANATIONS FOR, MACHINE LEARNING MODELS

(71) Applicant: Accenture Global Solutions Limited, Dublin (IE)

(72) Inventors: Subramaniaprabhu Jagadeesan, Chennai (IN); Bikash Chandra Mahato, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 362 days.

(21) Appl. No.: 17/980,898

(22) Filed: Nov. 4, 2022

(65) Prior Publication Data

US 2024/0153275 A1 May 9, 2024

(51) Int. Cl.
  G06V 20/54 (2022.01)
  G06V 10/75 (2022.01)
  G06V 10/764 (2022.01)
  G06V 10/766 (2022.01)
  G06V 10/77 (2022.01)
  G06V 10/776 (2022.01)
  G06V 10/82 (2022.01)
  G06V 20/40 (2022.01)
  G06V 20/52 (2022.01)
  G06V 40/16 (2022.01)

(52) U.S. Cl.
  CPC ............ *G06V 20/54* (2022.01); *G06V 10/751* (2022.01); *G06V 10/764* (2022.01); *G06V 10/766* (2022.01); *G06V 10/7715* (2022.01); *G06V 10/776* (2022.01); *G06V 10/82* (2022.01); *G06V 20/44* (2022.01); *G06V 20/53* (2022.01); *G06V 40/172* (2022.01)

(58) Field of Classification Search
  CPC .. G06V 20/54; G06V 10/7715; G06V 40/172; G06V 10/82; G06V 10/751; G06V 10/776; G06V 10/764; G06V 20/44; G06V 20/53; G06V 10/766
  See application file for complete search history.

(56) References Cited

U.S. PATENT DOCUMENTS

| | | | |
|---|---|---|---|
| 12,165,436 B1* | 12/2024 | Pertsel | G06V 20/58 |
| 2021/0019666 A1* | 1/2021 | Tsukamoto | G06V 10/7747 |
| 2021/0034914 A1* | 2/2021 | Bansal | G06V 20/58 |
| 2021/0118423 A1* | 4/2021 | Ping | G10L 19/018 |

* cited by examiner

*Primary Examiner* — David Perlman
(74) *Attorney, Agent, or Firm* — Polsinelli PC

(57) ABSTRACT

A device may process the surveillance video data to segment vehicles, and may utilize a segmentation guided attention network model with the vehicles to determine traffic density count data. The device may process an image segmentation map, with a regression analysis model, to derive traffic signal timing. The device may process the surveillance video data, with a deep learning model, to identify objects, and may utilize a YOLO model, with the objects, to determine object types. The device may utilize a curriculum loss model with the objects to determine crowd count data, and may process the surveillance video data, with a video analytics model, to identify first events. The device may process the surveillance video data, with a classifier and deep network models, to identify second events, and may process the determined information, with a dynamic text-based explanation model, to generate a text-based explanation and/or a failure prediction.

20 Claims, 11 Drawing Sheets

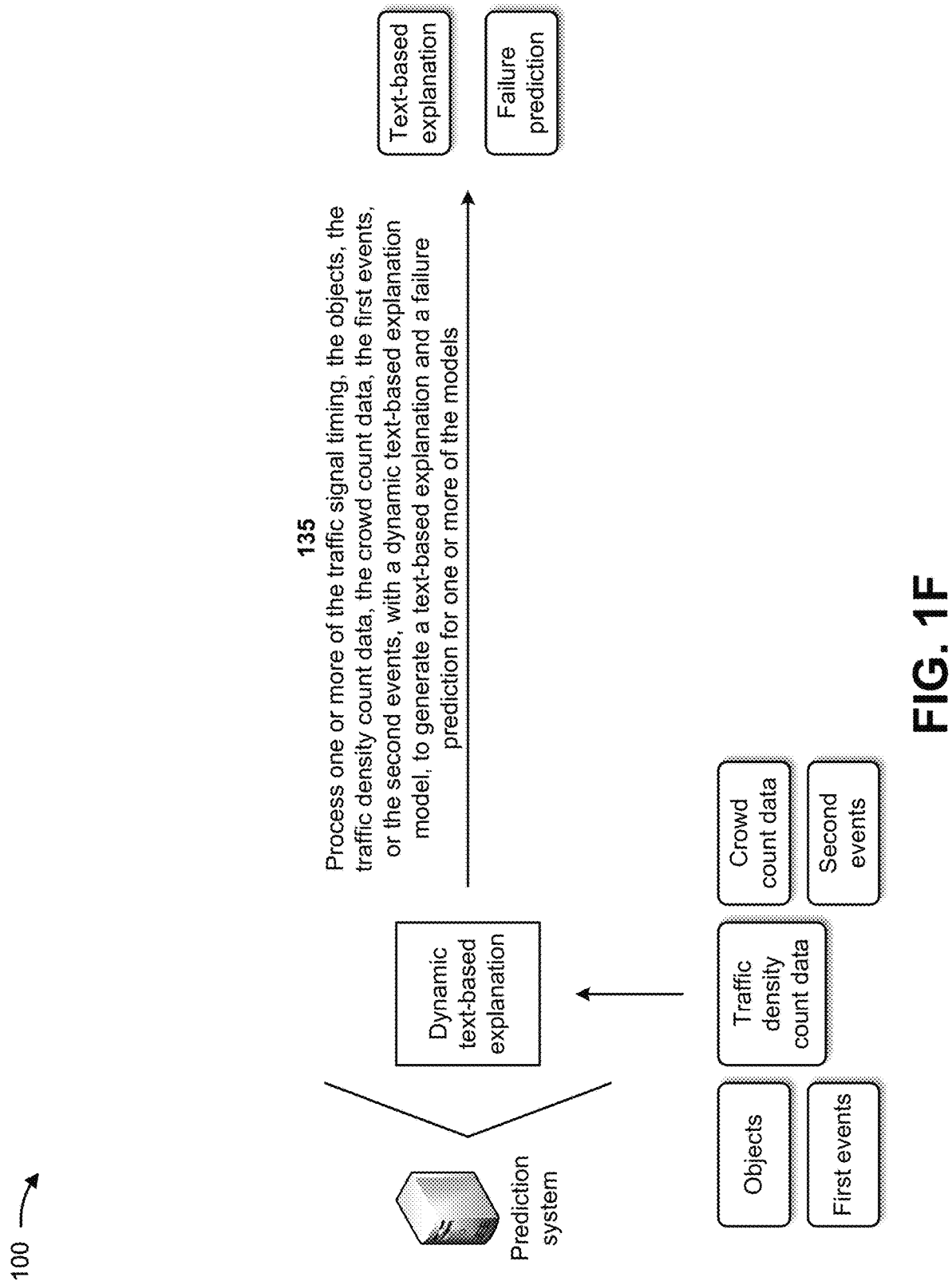

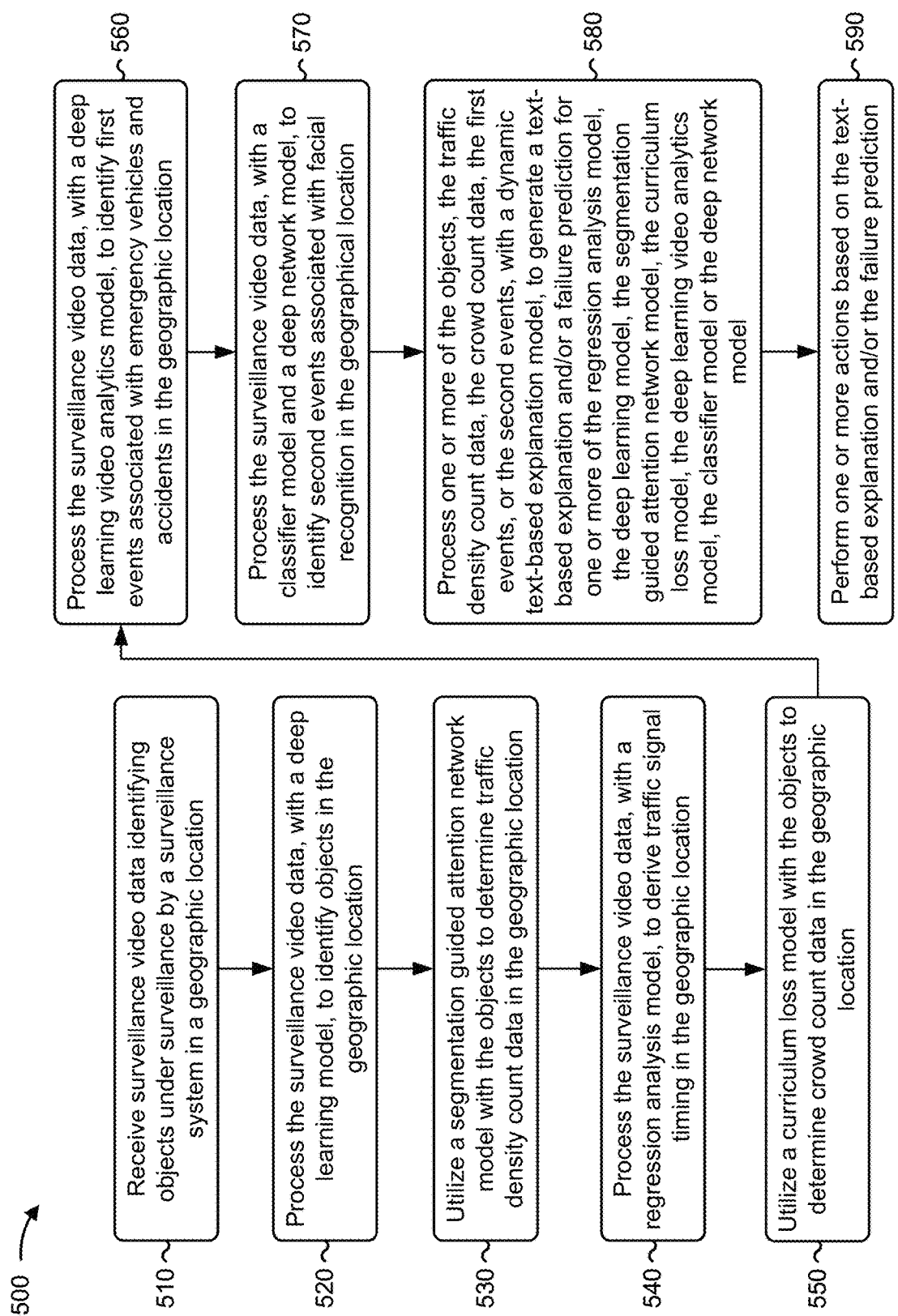

DETERMINING INCORRECT PREDICTIONS BY, AND GENERATING EXPLANATIONS FOR, MACHINE LEARNING MODELS

BACKGROUND

A smart city is a technology utilized in an urban area that manage assets, resources, and services of the urban area and efficiently uses data collected from different types of electronic methods, sensors, and/or the like.

SUMMARY

Some implementations described herein relate to a method. The method may include receiving surveillance video data captured by a surveillance system in a geographic location, and processing the surveillance video data, with a deep learning model, to identify objects in the geographic location. The method may include utilizing a segmentation guided attention network model with the objects to determine traffic density count data in the geographic location, and processing the surveillance video data, with a regression analysis model, to derive traffic signal timing in the geographic location. The method may include utilizing a curriculum loss model with the objects to determine crowd count data in the geographic location, and processing the surveillance video data, with a deep learning video analytics model, to identify first events associated with emergency vehicles and accidents in the geographic location. The method may include processing the surveillance video data, with a classifier model and a deep network model, to identify second events associated with facial recognition in the geographical location, and processing one or more of the objects, the traffic density count data, the crowd count data, the first events, or the second events, with a dynamic text-based explanation model, to generate a text-based explanation and/or a failure prediction for one or more of the regression analysis model, the deep learning model, the segmentation guided attention network model, the curriculum loss model, the deep learning video analytics model, the classifier model or the deep network model. The method may include performing one or more actions based on the text-based explanation and/or the failure prediction.

Some implementations described herein relate to a device. The device may include one or more memories and one or more processors coupled to the one or more memories. The one or more processors may be configured to receive surveillance video data captured by a surveillance system in a geographic location, and process the surveillance video data, with a regression analysis model, to derive traffic signal timing in the geographic location. The one or more processors may be configured to process the surveillance video data, with a deep learning model, to identify objects in the geographic location, where the deep learning model includes an object detection model that divides images into a grid system, and utilize a segmentation guided attention network model with the objects to determine traffic density count data in the geographic location. The one or more processors may be configured to utilize a curriculum loss model with the objects to determine crowd count data in the geographic location, and process the surveillance video data, with a deep learning video analytics model, to identify first events associated with emergency vehicles and accidents in the geographic location. The one or more processors may be configured to process the surveillance video data, with a classifier model and a deep network model, to identify second events associated with facial recognition in the geographical location, and process one or more of the objects, the traffic density count data, the crowd count data, the first events, or the second events, with a dynamic text-based explanation model, to generate a text-based explanation and/or a failure prediction for one or more of the regression analysis model, the deep learning model, the segmentation guided attention network model, the curriculum loss model, the deep learning video analytics model, the classifier model or the deep network model. The one or more processors may be configured to perform one or more actions based on the text-based explanation and/or the failure prediction.

Some implementations described herein relate to a non-transitory computer-readable medium that stores a set of instructions for a device. The set of instructions, when executed by one or more processors of the device, may cause the device to receive surveillance video data captured by a surveillance system in a geographic location, and process the surveillance video data, with a regression analysis model, to derive traffic signal timing in the geographic location. The set of instructions, when executed by one or more processors of the device, may cause the device to process the surveillance video data, with a deep learning model, to identify objects in the geographic location, and utilize a segmentation guided attention network model, and a convolutional neural network as backbone, with the objects to determine traffic density count data in the geographic location. The set of instructions, when executed by one or more processors of the device, may cause the device to utilize a curriculum loss model with the objects to determine crowd count data in the geographic location, and process the surveillance video data, with a deep learning video analytics model, to identify first events associated with emergency vehicles and accidents in the geographic location. The set of instructions, when executed by one or more processors of the device, may cause the device to process the surveillance video data, with a classifier model and a deep network model, to identify second events associated with facial recognition in the geographical location, and process one or more of the objects, the traffic density count data, the crowd count data, the first events, or the second events, with a dynamic text-based explanation model, to generate a text-based explanation and/or a failure prediction for one or more of the regression analysis model, the deep learning model, the segmentation guided attention network model, the curriculum loss model, the deep learning video analytics model, the classifier model or the deep network model. The set of instructions, when executed by one or more processors of the device, may cause the device to perform one or more actions based on the text-based explanation and/or the failure prediction.

BRIEF DESCRIPTION OF THE DRAWINGS

FIGS. 1A-1G are diagrams of an example implementation described herein.

FIG. 5 is a flowchart of an example process for determining incorrect predictions by machine learning models and generating explanations for predictions of the machine learning models.

DETAILED DESCRIPTION

Figure 1A:
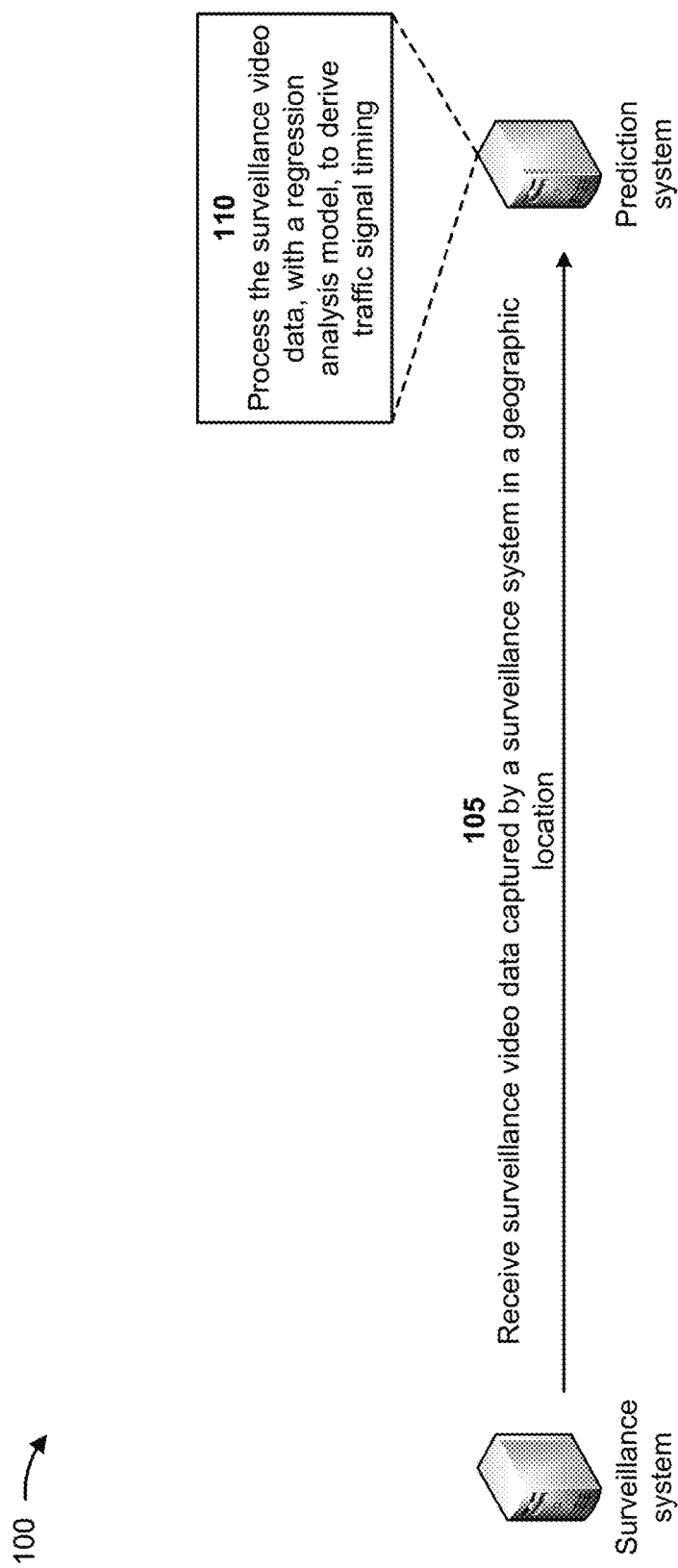

The following detailed description of example implementations refers to the accompanying drawings. The same reference numbers in different drawings may identify the same or similar elements.

A smart city may include an active surveillance system with video cameras that assist various services, such as intelligent traffic monitoring, emergency vehicle detection and monitoring, locating a person in a video using facial recognition, and/or the like. For example, conventional traffic monitoring may require the presence of traffic police during rush hours or may utilize a fixed timer-based operation to avoid a human presence all the time. A problem occurs when there is a need to allow an emergency vehicle (e.g., an ambulance, a fire truck, a police car, and/or the like) to pass through an intersection. Video analytics of images received from the surveillance system may enable identification and tracking of emergency vehicles by the surveillance system. However, machine learning models utilized by the surveillance system may fail to explain predictions of the machine learning models. Furthermore, the machine learning models process a huge quantity (e.g., tens of thousands or more) of images every day and may generate incorrect predictions. Without explanations of the predictions of the machine learning models, it is impossible to identify the incorrect predictions generated by the machine learning models.

Therefore, current techniques for processing video data captured by a surveillance system consume computing resources (e.g., processing resources, memory resources, communication resources, and/or the like), networking resources, and/or the like associated with failing to generate explanations for machine learning model predictions, failing to identify incorrect predictions by machine learning models, utilizing the incorrect predictions from the machine learning models to incorrectly manage a smart city (e.g., cause traffic congestion, traffic accidents, and/or the like), and/or the like.

Some implementations described herein relate to a prediction system that determines incorrect predictions by machine learning models and generates explanations for predictions of the machine learning models. For example, the prediction system may receive surveillance video data captured by a surveillance system in a geographic location, and may process the surveillance video data, with a regression analysis model, to derive traffic signal timing in the geographic location. The prediction system may process the surveillance video data, with a deep learning model, to identify objects in the geographic location, and may utilize a segmentation guided attention network model with the objects to determine traffic density count data in the geographic location. The prediction system may utilize a curriculum loss model with the objects to determine crowd count data in the geographic location, and may process the surveillance video data, with a deep learning video analytics model, to identify first events associated with emergency vehicles and accidents in the geographic location. The prediction system may process the surveillance video data, with a classifier model and a deep network model, to identify second events associated with facial recognition in the geographical location. The prediction system may process one or more of the objects, the traffic density count data, the crowd count data, the first events, or the second events, with a dynamic text-based explanation model, to generate a text-based explanation and/or a failure prediction for one or more of the models. The prediction system may perform one or more actions based on the text-based explanation and/or the failure prediction.

In this way, the prediction system determines incorrect predictions by machine learning models and generates explanations for predictions of the machine learning models. The prediction system may utilize deep learning model-based video analytics to detect events, such as emergency vehicle detection and tracking, facial recognition, accident detection, traffic density counting, and/or the like for intelligent operation in a smart city. The prediction system may provide explanations for machine learning model predictions (e.g., an explanation of a facial recognition) by providing textual information that is dynamically generated through inspection of attributes. The prediction system may identify incorrect machine learning model predictions and may utilize the identification of the incorrect predictions to retrain and/or improve the machine learning models. This, in turn, conserves computing resources, networking resources, and/or the like that would otherwise have been consumed in failing to generate explanations for machine learning model predictions, failing to identify incorrect predictions by machine learning models, utilizing the incorrect predictions from the machine learning models to incorrectly manage a smart city (e.g., cause traffic congestion, traffic accidents, and/or the like), and/or the like.

FIGS. 1A-1G are diagrams of an example 100 associated with determining incorrect predictions by machine learning models and generating explanations for predictions of the machine learning models. As shown in FIGS. 1A-1G, example 100 includes a prediction system associated with a surveillance system. The prediction system may include a system that determines incorrect predictions by machine learning models and generates explanations for predictions of the machine learning models. The surveillance system may include system that perform surveillance of a geographical location. Further details of the prediction system and the surveillance system are provided elsewhere herein.

As shown in FIG. 1A, and by reference number 105, the prediction system may receive surveillance video data captured by a surveillance system in a geographic location. For example, the surveillance system may surveille and manage assets, resources, services, and/or the like in the geographic location (e.g., an urban area) based on data collected from different types of electronic methods, sensors, and/or the like. For example, the surveillance system may monitor and manage traffic and transportation systems, power plants, utilities, water supply networks, waste systems, criminal investigations, information systems, schools, libraries, hospitals, emergency vehicles, and other community services. In some implementations, the surveillance system may capture surveillance video data associated with citizens, buildings, assets, vehicles, and/or the like of the geographic location. The surveillance video data may include videos, images, and/or the like associated with the geographic location.

In some implementations, the prediction system may continuously receive the surveillance video data from the surveillance system, may periodically receive the surveillance video data from the surveillance system, may receive the surveillance video data from the surveillance system based on providing a request for the surveillance video data to the surveillance system, and/or the like. In some implementations, the prediction system may store the surveillance video data in a data structure (e.g., a database, a table, a list, and/or the like) associated with the prediction system.

As further shown in FIG. 1A, and by reference number 110, the prediction system may process the surveillance video data, with a deep network model followed by a regression analysis model, to derive traffic signal timing in the geographical location. For example, the prediction system may utilize the surveillance video data for traffic density detection in the geographic location, detection and tracking of emergency vehicles in the geographic location, accident identification in the geographic location, facial recognition of a person of interest, and/or the like. In some implementations, the prediction system may process the surveillance video data to identify a vehicle count associated with traffic in the geographic location. The prediction system may process the vehicle count, with a deep network model followed by a regression analysis model, to derive a traffic signal timing in the geographical location. For example, the prediction system may detect an emergency vehicle in traffic, and may modify the traffic signal timing so that the emergency vehicle may quickly travel through the geographic location (e.g., to a hospital or an accident scene), which may save lives. In another example, the prediction system may detect a traffic accident in the geographic location, and may generate an alarm based on detecting the traffic accident. The prediction system may also modify the traffic signal timing so that an emergency vehicle may quickly travel through the geographic location to the traffic accident scene.

Figure 1B:
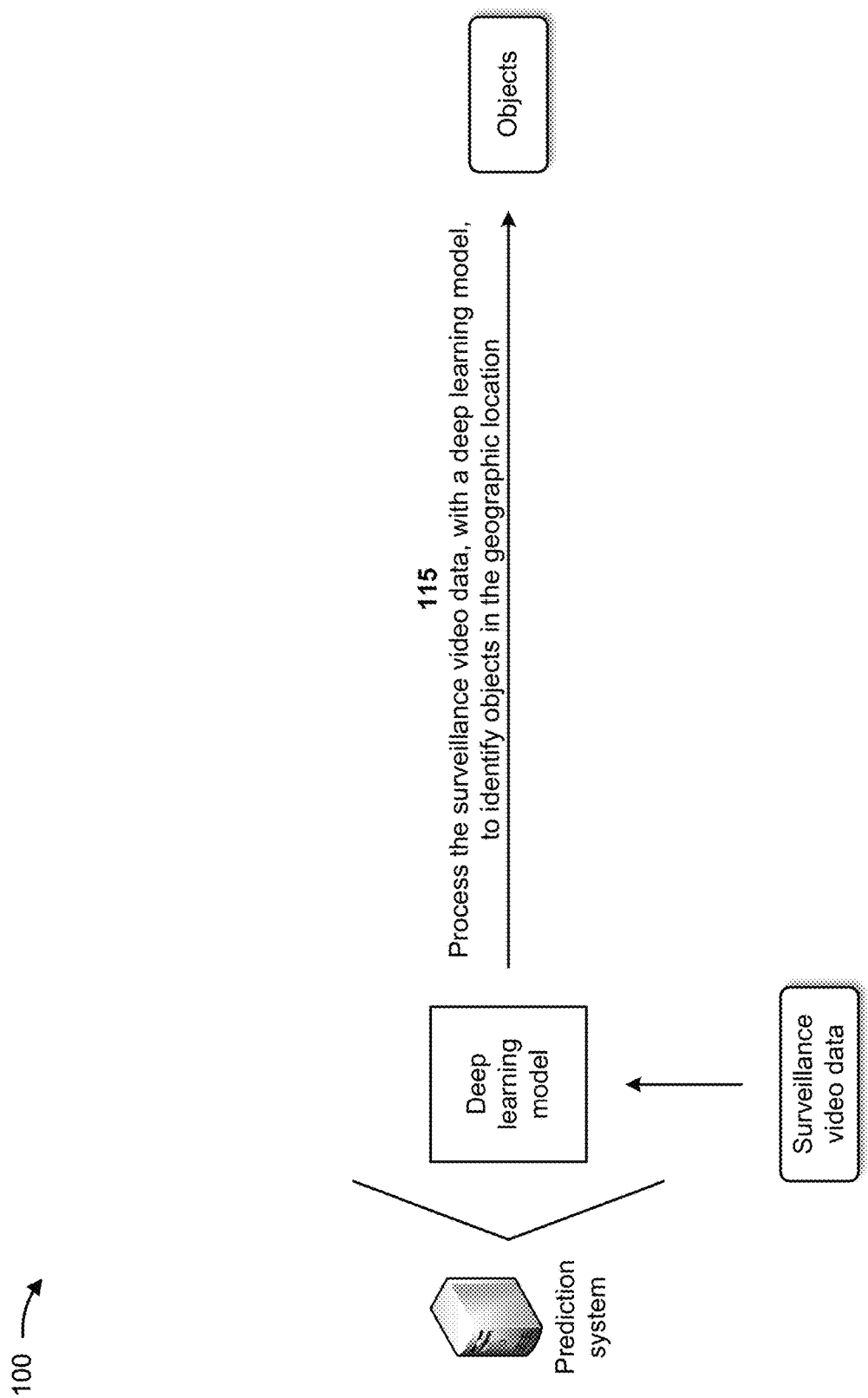

As shown in FIG. 1B, and by reference number 115, the prediction system may process the surveillance video data, with a deep learning model, to identify objects in the geographic location. For example, the prediction system may train a deep learning model for object detection based on the surveillance video data. In some implementations, the deep learning model may include a YOLO (you only look once) object detection model that detects and recognizes various objects in an image (e.g., in real time). Object detection in the YOLO model may be executed as a single regression problem and may provide class probabilities of detected images. In some implementations, the prediction system may train the deep learning model with video data identifying non-emergency vehicles, emergency vehicles, accident scenes, pedestrians, and/or the like. Further details of training a model are provided below in connection with FIG. 2. In some implementations, once the deep learning model is trained, the prediction system may process the surveillance video data, with the deep learning model, to identify objects (e.g., emergency vehicles, persons of interest, buildings, and/or the like) in the geographic location.

Figure 1C:
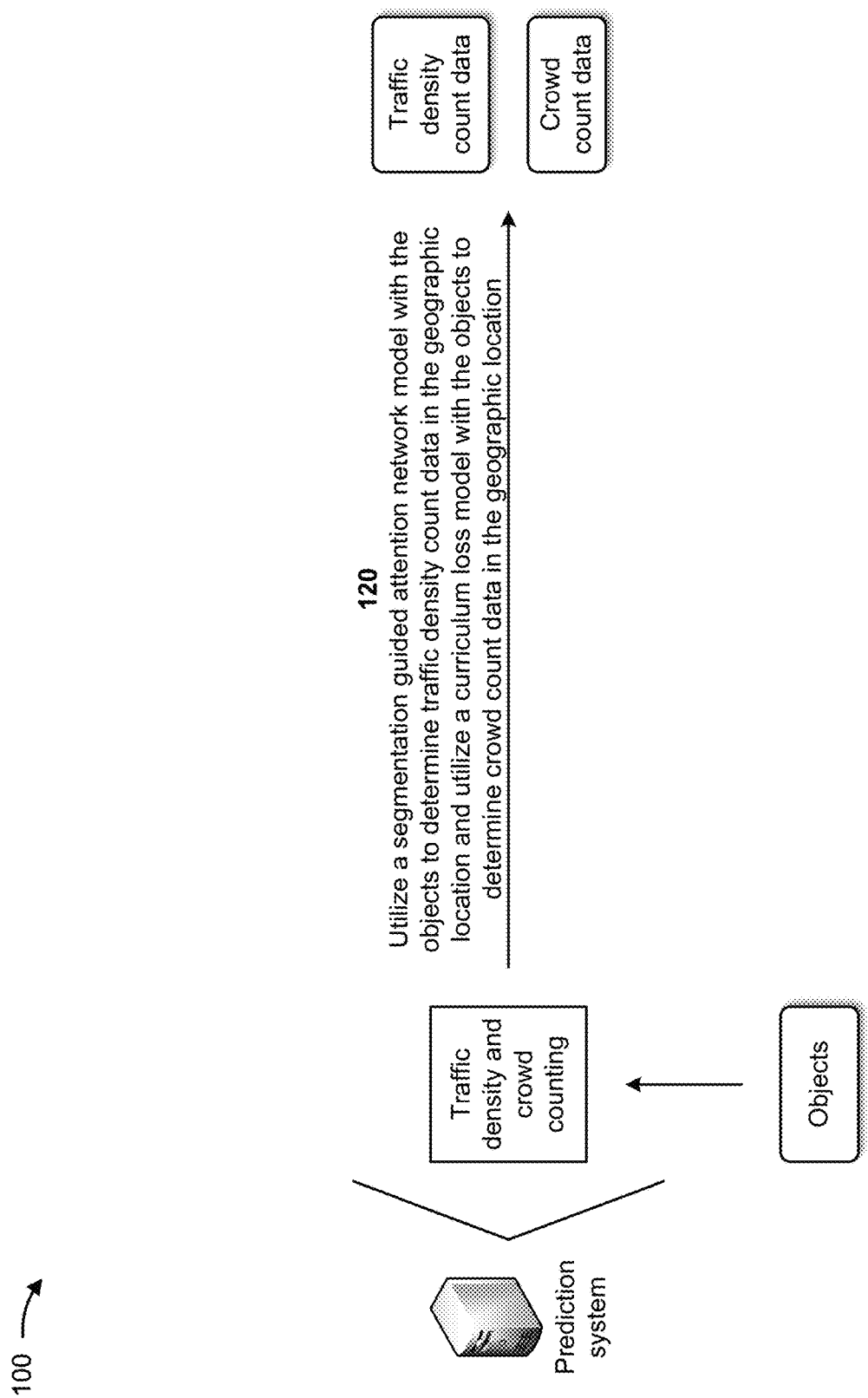

As shown in FIG. 1C, and by reference number 120, the prediction system may utilize a segmentation guided attention network (SGANet) model with the objects to determine traffic density count data in the geographic location and utilize a curriculum loss model with the objects to determine crowd count data in the geographic location. For example, a SGANet model may include a deep convolutional neural network (CNN) model that may be utilized to count objects in images. The prediction system may process the objects identified in the surveillance video data, with the SGANet model, to determine the traffic density count data in the geographic location. The traffic density count data may include data identifying a quantity of traffic (e.g., vehicles) in the geographic location or a portion of the geographic location (e.g., a street, a sidewalk, and/or the like). In some implementations, the prediction system may utilize the SGANet model, with an Inception model (e.g., a CNN model for assisting in image analysis and object detection), to process the objects and determine the traffic density count data.

In some implementations, the prediction system may process the objects, with a curriculum loss model, to determine the crowd count data in the geographic location. The crowd count data may include data identifying a quantity of people in the geographic location or a portion of the geographic location, a quantity of vehicles on a road, and/or the like. Generalization may be important for many deep network models and may become more challenging when high robustness is required for learning with noisy labels. A "0-1" loss has monotonic relationship between empirical adversary (reweighted) risk, and is robust to outliers. To efficiently optimize "0-1" loss while keeping its robust properties, a deep network model may include a curriculum loss. Thus, the curriculum loss model may include a deep network model with the curriculum loss. In some implementations, the prediction system may utilize the traffic density count data and the crowd count data to automate traffic monitoring for the geographic location and to assist administrative agencies through real time detection of various events from the surveillance video data using computer vision and deep learning.

Figure 1D:
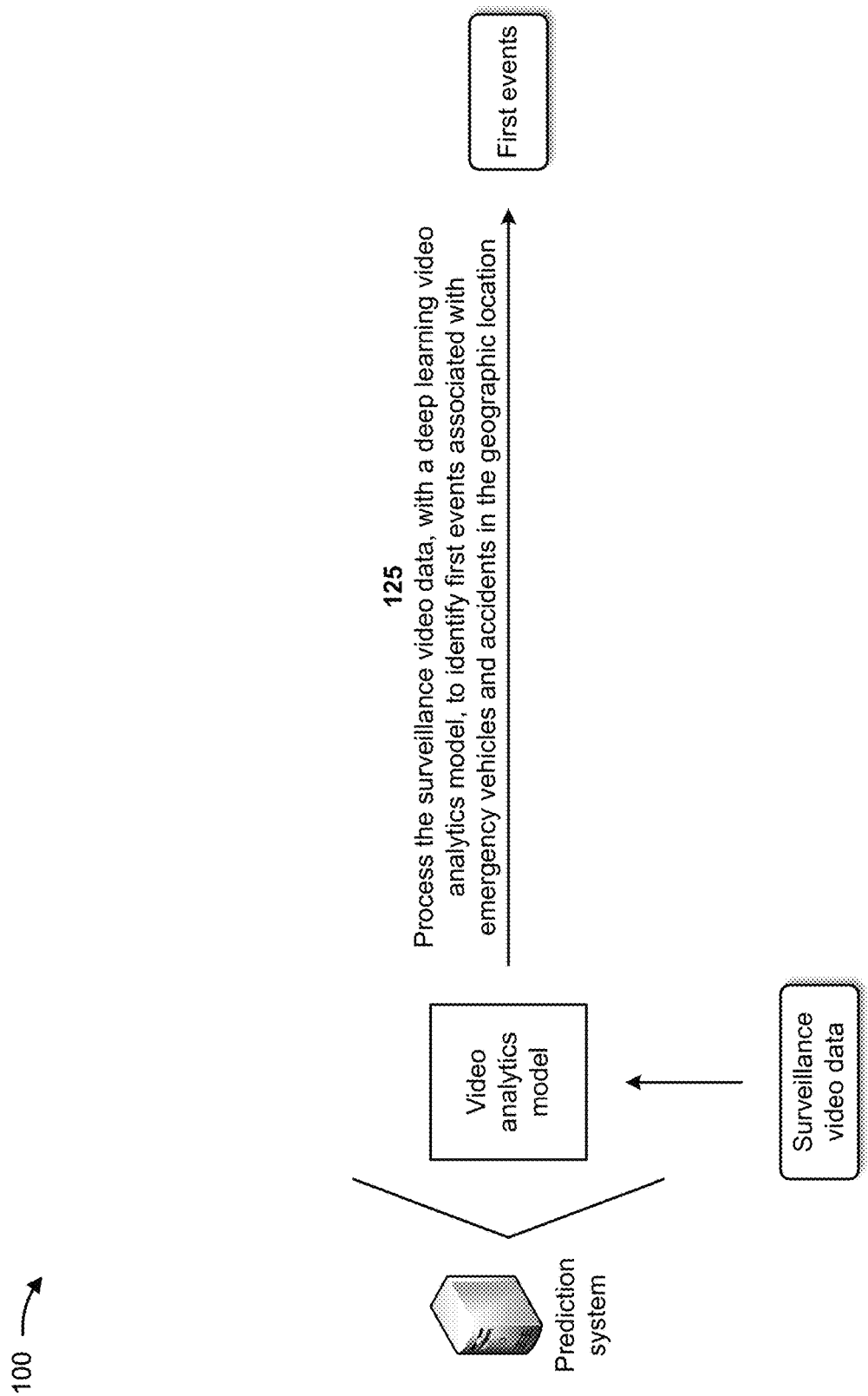

As shown in FIG. 1D, and by reference number 125, the prediction system may process the surveillance video data, with a deep learning video analytics model, to identify first events associated with emergency vehicles and accidents in the geographic location. For example, the prediction system may train a deep learning video analytics model to identify the first events associated with emergency vehicles and accidents in the geographic location. In some implementations, the deep learning video analytics model may include a deep neural network (DNN) object detection model that detects and recognizes various objects in an image (e.g., in real time). Object detection in the DNN model may be executed as a regression problem and may provide class probabilities of detected images. In some implementations, the prediction system may train the deep learning video analytics model with video data identifying non-emergency vehicles, emergency vehicles, accident scenes, pedestrians, and/or the like. Further details of training a model are provided below in connection with FIG. 2. In some implementations, once the deep learning video analytics model is trained, the prediction system may process the surveillance video data, with the deep learning video analytics model, to identify the first events associated with emergency vehicles and accidents in the geographic location.

Figure 1E:
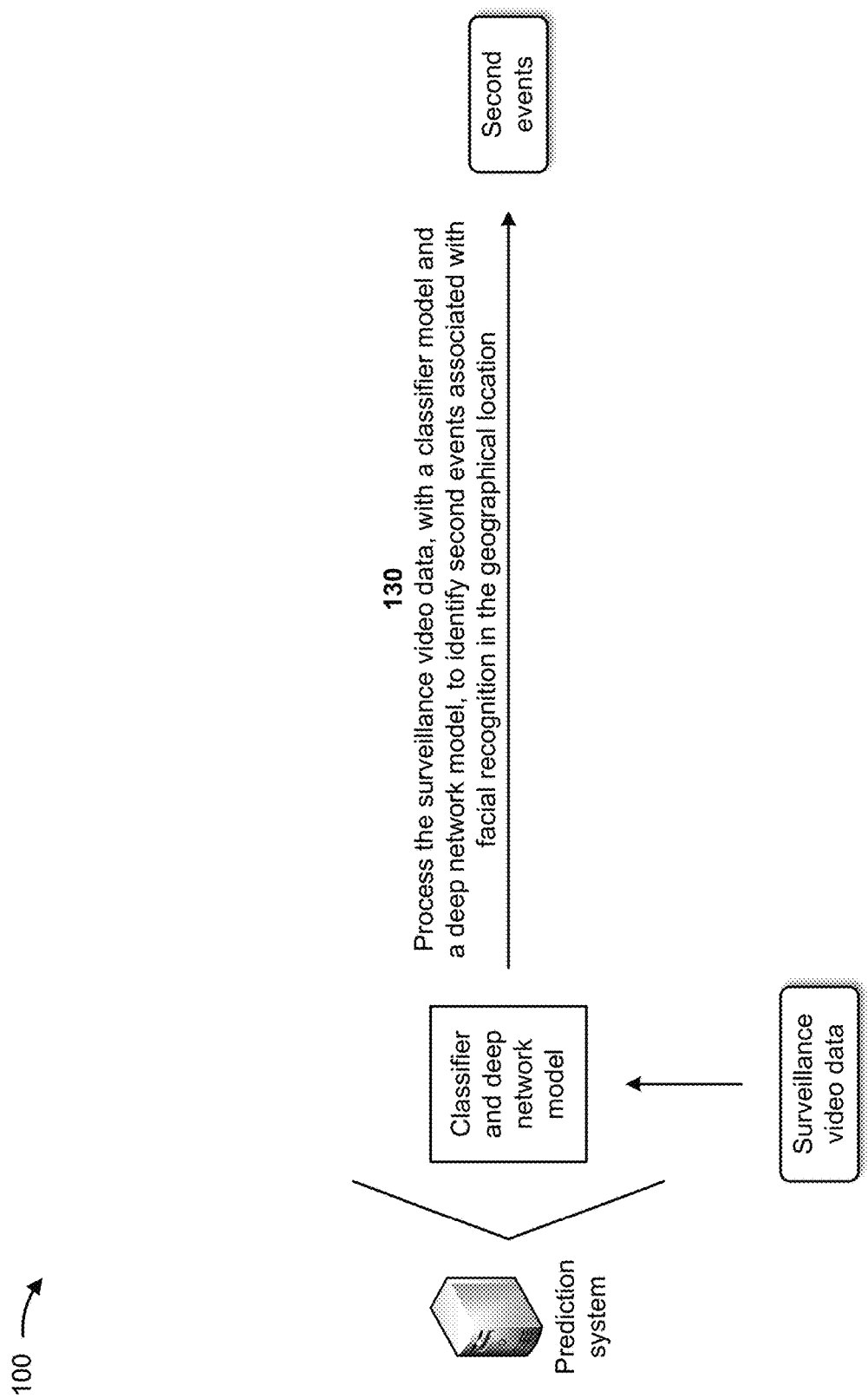

As shown in FIG. 1E, and by reference number 130, the prediction system may process the surveillance video data, with a classifier model and a deep network model, to identify second events associated with facial recognition in the geographical location. For example, the prediction system be associated with a classifier model (e.g., a Haar cascade classifier model) and a deep network model (e.g., a visual geometry group (VGG) CNN model). For facial recognition of a person of interest, the prediction system may localize a face of the person from the surveillance video data using the classifier model, and may utilize the deep network model to perform facial recognition of the localized face of the person. In some implementations, the prediction system may train the classifier model and the deep network model with video data identifying people, human faces, non-human faces, animals, and/or the like. Further details of training a model are provided below in connection with FIG. 2.

In some implementations, the prediction system may generate alarms for the second events associated with facial recognition in the geographical location and when the second events identify people of interest (e.g., are recognized by the prediction system). A person of interest may include an escapee, a criminal, a missing person, and/or the like associated with a facial image that is uploaded by an administrative agency (e.g., a police department, a government, and/or the like) to a data structure associated with the prediction system.

As shown in FIG. 1F, and by reference number 135, the prediction system may process one or more of the objects, the traffic density count data, the crowd count data, the first events, or the second events, with a dynamic text-based explanation model, to generate a text-based explanation and/or a failure prediction for one or more of the models. For example, the prediction system may provide robust methods to explain outputs by each of the models described above. In some implementations, the prediction system may process the traffic signal timing, with the dynamic text-based explanation model, to generate a text-based explanation and/or a failure prediction for an object detection or classification model; may process the objects, with the dynamic text-based explanation model, to generate a text-based explanation and/or a failure prediction for the deep learning model; may process the traffic density count data, with the dynamic text-based explanation model, to generate a text-based explanation and/or a failure prediction for the segmentation guided attention network model; may process the crowd count data, with the dynamic text-based explanation model, to generate a text-based explanation and/or a failure prediction for the curriculum loss model; may process the first events, with the dynamic text-based explanation model, to generate a text-based explanation and/or a failure prediction for the deep learning video analytics model; may process the second events, with the dynamic text-based explanation model, to generate a text-based explanation and/or a failure prediction for the classifier model and the deep network model; and/or the like.

In some implementations, the dynamic text-based explanation model may include a local interpretable model-agnostic explanations (LIME) model that generates text-based explanations of facial recognitions based on feature similarity and in human understandable way. The text-based explanations and/or the failure predictions generated by the prediction system may enable the one or more models to be improved and/or audited by providing insights into the predictions of the one or more models.

In some implementations, the prediction system may utilize the LIME model to explain facial recognitions through pixel attribution and by deriving a closest matching image from a data structure. In this way, the prediction system enables a user to judge model predictions and to assess trustworthiness of the models.

In some implementations, when processing the one or more of the objects, the traffic density count data, the crowd count data, the first events, or the second events, with the dynamic text-based explanation model, to generate the text-based explanation and/or the failure prediction, the prediction system may process the one or more of the objects, the traffic density count data, the crowd count data, the first events, or the second events, with the LIME model, to generate a set of features. The prediction system may process the set of features, with a VGG CNN model, to generate a processed set of features. The prediction system may map the processed set of features to a vector space of a deep long short-term memory (LSTM) model, and may generate the text-based explanation via the deep LSTM model.

In some implementations, when processing the one or more of the objects, the traffic density count data, the crowd count data, the first events, or the second events, with the dynamic text-based explanation model, to generate the text-based explanation and/or the failure prediction, the prediction system may compare a golden dataset of images with images of the surveillance video data utilized by the one or more of the regression analysis model, the deep learning model, the segmentation guided attention network model, the curriculum loss model, the deep learning video analytics model, the classifier model or the deep network model. The prediction system may identify a set of images, associated with a failure by the one or more of an object detection or classification model, the regression analysis model, the deep learning model, the segmentation guided attention network model, the curriculum loss model, the deep learning video analytics model, the classifier model or the deep network model, based on comparing the golden dataset of images with images of the surveillance video data, and may generate the failure prediction based on the set of images.

The failure prediction may include identification of a set of images associated with a failure by the one or more of the object detection or classification model, the regression analysis model, the deep learning model, the segmentation guided attention network model, the curriculum loss model, the deep learning video analytics model, the classifier model or the deep network model. In some implementations, the failure prediction may include a textual explanation of a failure by the one or more of the regression analysis model, the deep learning model, the segmentation guided attention network model, the curriculum loss model, the deep learning video analytics model, the classifier model or the deep network model.

Video surveillance of a smart city requires processing of a large quantity of images every day, making it impossible to manually check explanations for all the images and to identify a failure scenario. The prediction system provides an approach for identifying a set of images for which a model has higher chances of failure (e.g., by identifying a closest match from the golden dataset).

In this way, the prediction system may integrate deep learning-based video analytics to detect events, such as emergency vehicle detection and tracking, facial recognition, accident detection, traffic density counting, and/or the like for intelligent operation in a smart city. The prediction system may explain a facial recognition by providing textual information that is dynamically generated through inspection of facial attributes generated by explainable methods. The prediction system may identify images associated with a most probable failure prediction for a model based on explainable feature attribution in connection with a golden dataset.

Figure 1G:
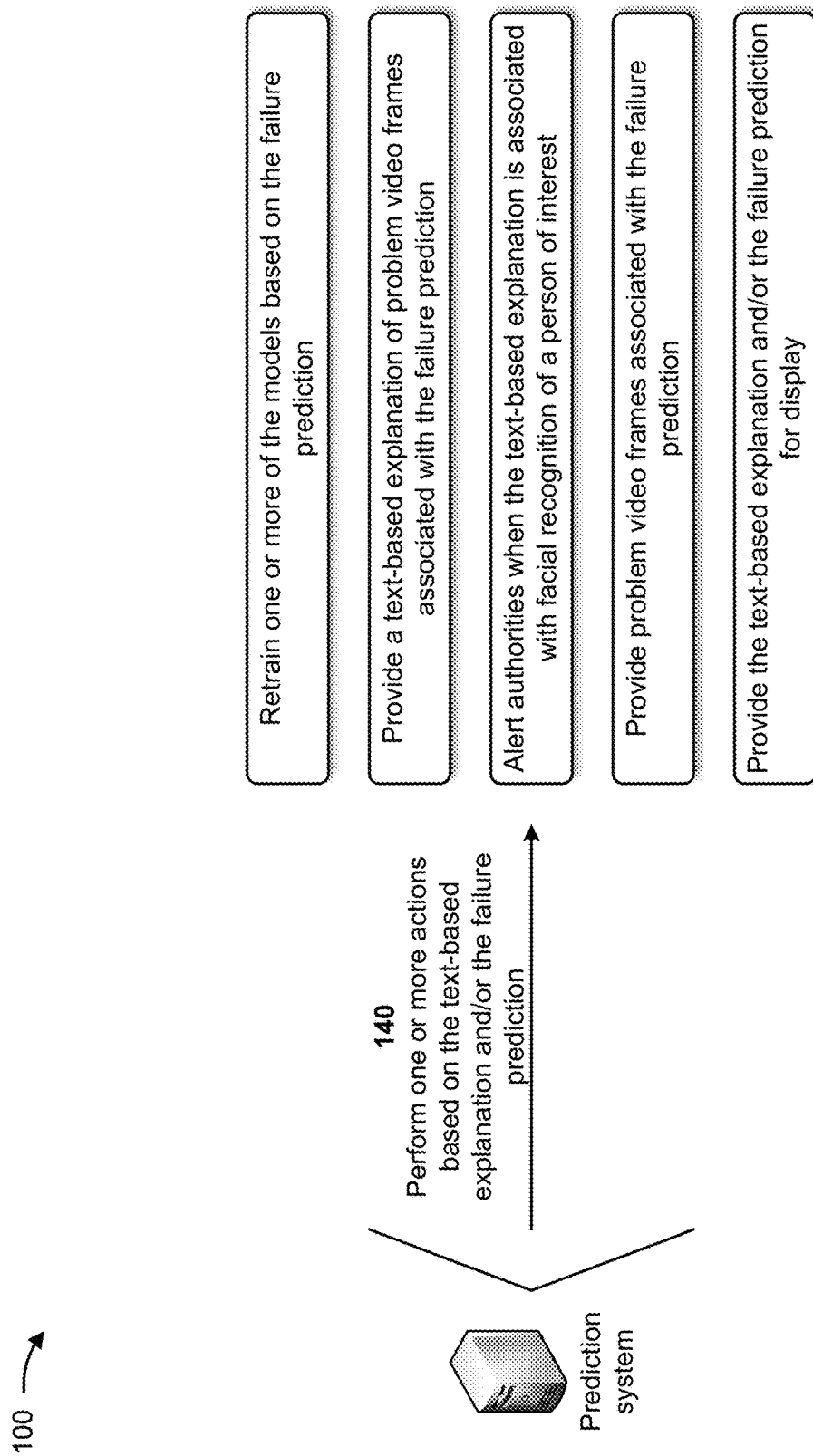

As shown in FIG. 1G, and by reference number 140, the prediction system may perform one or more actions based on the text-based explanation and/or the failure prediction. In some implementations, performing the one or more actions includes the prediction system retraining one or more of the models based on the failure prediction. For example, the prediction system may utilize the failure prediction as additional training data for retraining the one or more of the models, thereby increasing the quantity of training data available for training the one or more of the models. Accordingly, the prediction system may conserve computing resources associated with identifying, obtaining, and/or generating historical data for training the one or more of the models relative to other systems for identifying, obtaining, and/or generating historical data for training machine learning models.

In some implementations, performing the one or more actions includes the prediction system providing a text-based explanation of problem video frames associated with the failure prediction. For example, the prediction system may identify problem video frames associated with a failed prediction by one of the models, and may generate a text-based explanation of the problem video frames (e.g., the model identified a dog as a person). The prediction system may provide the problem video frames and the text-based explanation for display to a user of the prediction system. In this way, the prediction system conserves computing resources, networking resources, and/or the like that would otherwise have been consumed in failing to generate explanations for machine learning model predictions.

In some implementations, performing the one or more actions includes the prediction system alerting authorities when the text-based explanation is associated with facial recognition of a person of interest. For example, when the prediction system identifies a person of interest (e.g., a criminal), the prediction system may generate a text-based explanation of the person of interest. The text-based explanation may indicate that the identified person matches the person of interest because of specific facial attributes (e.g., eye color, bone structure, and/or the like). The prediction system may alert authorities about a last known location of the person of interest as determined from the surveillance video data. In this way, the prediction system conserves computing resources, networking resources, and/or the like that would otherwise have been consumed in failing to provide understandable machine learning model predictions.

In some implementations, performing the one or more actions includes the prediction system providing problem video frames associated with the failure prediction. For example, the prediction system may identify problem video frames associated with a failed prediction by one of the models, and may provide the problem video frames for display to a user of the prediction system. In this way, the prediction system conserves computing resources, networking resources, and/or the like that would otherwise have been consumed in failing to generate explanations for machine learning model predictions.

In some implementations, performing the one or more actions includes the prediction system providing the text-based explanation and/or the failure prediction for display. For example, the prediction system may provide the text-based explanation and/or the failure prediction for display to a user of the prediction system. The user may utilize the text-based explanation to further understand a prediction of one of the models, and may utilize the failure prediction to modify and/or improve the one of the models. In some implementations, the text-based explanation may be replaced with an audible explanation, may be utilized by other computer-implemented models to make decisions and/or to improve performance of the models described in connection with FIGS. 1A-1G, and/or the like. In this way, the prediction system conserves computing resources, networking resources, and/or the like that would otherwise have been consumed in failing to identify incorrect predictions by machine learning models, utilizing the incorrect predictions from machine learning models to incorrectly manage a smart city, and/or the like.

In this way, the prediction system determines incorrect predictions by machine learning models and generates explanations for predictions of the machine learning models. The prediction system may utilize deep learning model-based video analytics to detect events, such as emergency vehicle detection and tracking, facial recognition, accident detection, traffic density counting, and/or the like for intelligent operation in a smart city. The prediction system may provide explanations for machine learning model predictions (e.g., an explanation of a facial recognition) by providing textual information that is dynamically generated through inspection of attributes. The prediction system may identify incorrect machine learning model predictions and may utilize the identification of the incorrect predictions to retrain and/or improve the machine learning models. This, in turn, conserves computing resources, networking resources, and/or the like that would otherwise have been consumed in failing to generate explanations for machine learning model predictions, failing to identify incorrect predictions by machine learning models, utilizing the incorrect predictions from the machine learning models to incorrectly manage a smart city (e.g., cause traffic congestion, traffic accidents, and/or the like), and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
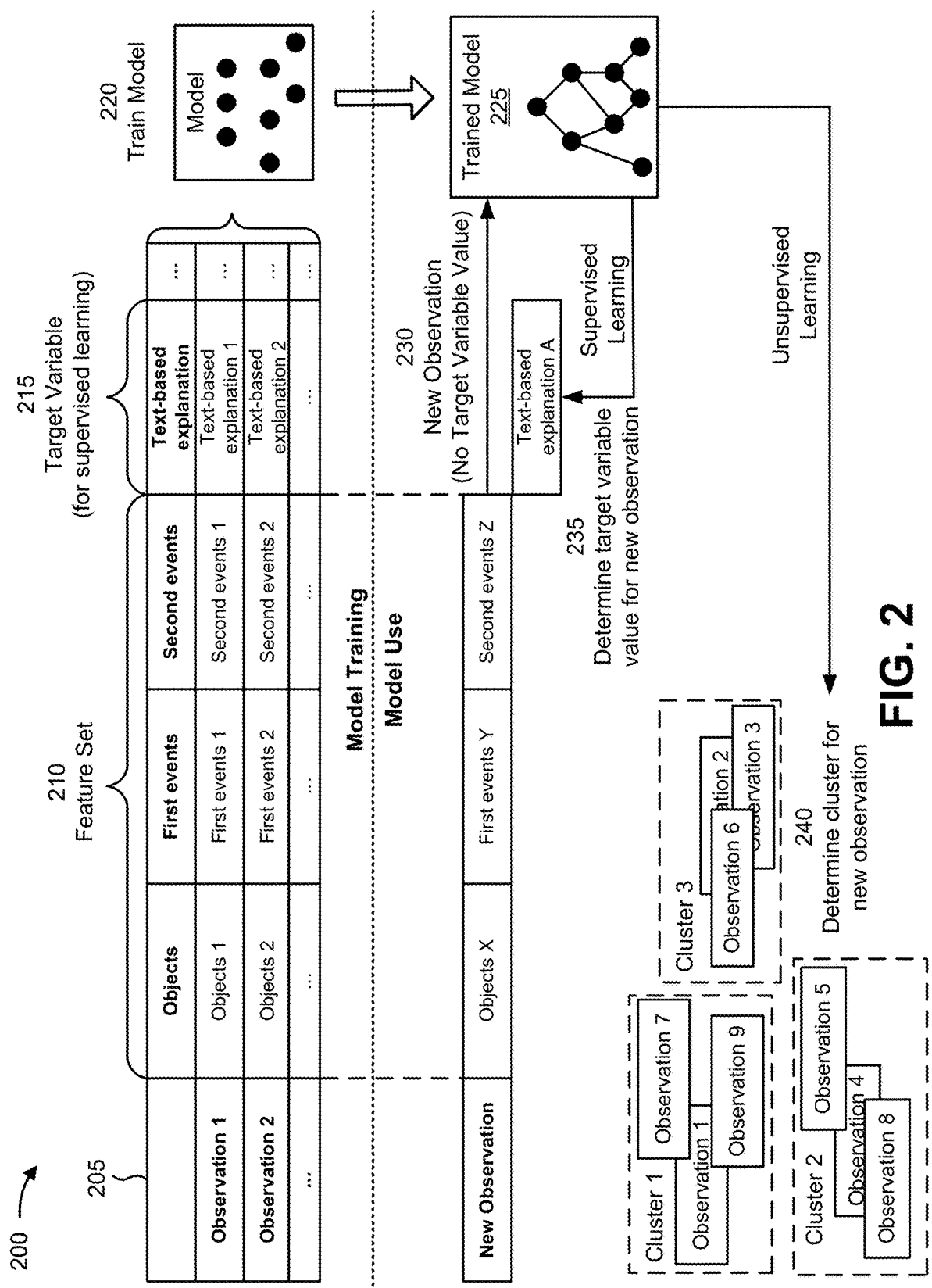
FIG. 2 is a diagram illustrating an example of training and using a machine learning model.

FIG. 2 is a diagram illustrating an example 200 of training and using a machine learning model for determining incorrect predictions by machine learning models and generating explanations for predictions of the machine learning models. The machine learning model training and usage described herein may be performed using a machine learning system. The machine learning system may include or may be included in a computing device, a server, a cloud computing environment, and/or the like, such as the prediction system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the prediction system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the prediction system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of objects, a second feature of first events, a third feature of second events, and so on. As shown, for a first observation, the first feature may have a value of objects 1, the second feature may have a value of first events 1, the third feature may have a value of second events 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be a text-based explanation and may include a value of text-based explanation 1 for the first observation.

The target variable may represent a value that a machine learning model is being trained to predict, and the feature set may represent the variables that are input to a machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of objects X, a second feature of first events Y, a third feature of second events Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of text-based explanation A for the target variable for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an objects cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a first events cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine incorrect predictions by machine learning models and generate explanations for predictions of the machine learning models. The machine learning system enables recognition and/or identification of tens, hundreds, thousands, or millions of features and/or feature values for tens, hundreds, thousands, or millions of observations, thereby increasing accuracy and consistency and reducing delay associated with determining incorrect predictions by machine learning models and generating explanations for predictions of the machine learning models relative to requiring computing resources to be allocated for tens, hundreds, or thousands of operators to manually determine incorrect predictions by machine learning models and generate explanations for predictions of the machine learning models.

As indicated above, FIG. 2 is provided as an example. Other examples may differ from what is described in connection with FIG. 2.

Figure 3:
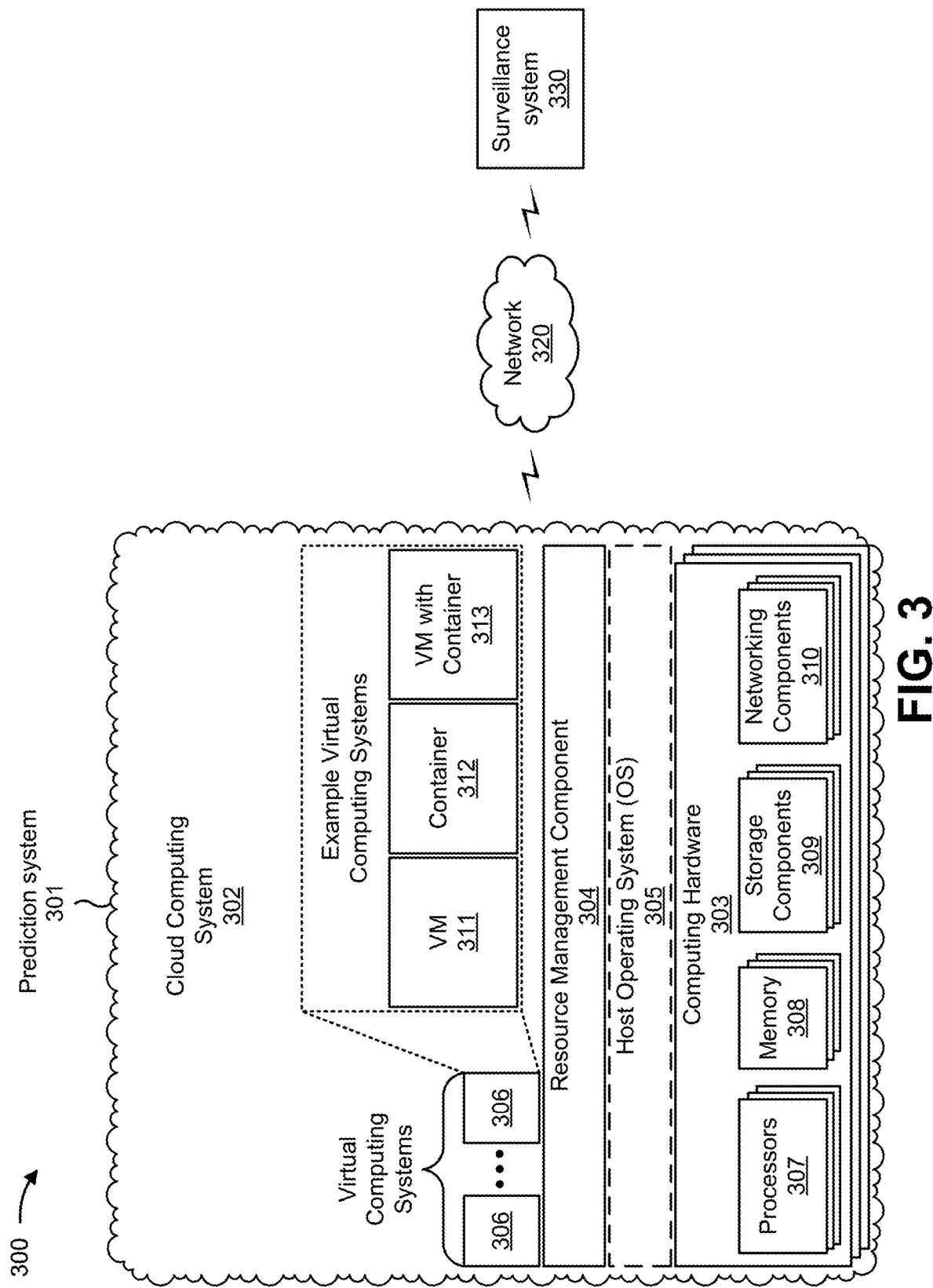
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a prediction system 301, which may include one or more elements of and/or may execute within a cloud computing system 302. The cloud computing system 302 may include one or more elements 303-313, as described in more detail below. As further shown in FIG. 3, the environment 300 may include a network 320 and/or a surveillance system 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the prediction system 301 may include one or more elements 303-313 of the cloud computing system 302, may execute within the cloud computing system 302, and/or may be hosted within the cloud computing system 302, in some implementations, the prediction system 301 may not be cloud-based (e.g., may be implemented outside of a cloud computing system) or may be partially cloud-based. For example, the prediction system 301 may include one or more devices that are not part of the cloud computing system 302, such as device 400 of FIG. 4, which may include a stand-alone server or another type of computing device. The prediction system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The surveillance system 330 may include one or more devices capable of receiving, generating, storing, processing, providing, and/or routing information, as described elsewhere herein. The surveillance system 330 may include a communication device and/or a computing device. For example, the surveillance system 330 may include a server, such as an application server, a client server, a web server, a database server, a host server, a proxy server, a virtual server (e.g., executing on computing hardware), or a server in a cloud computing system. In some implementations, the surveillance system 330 may include computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
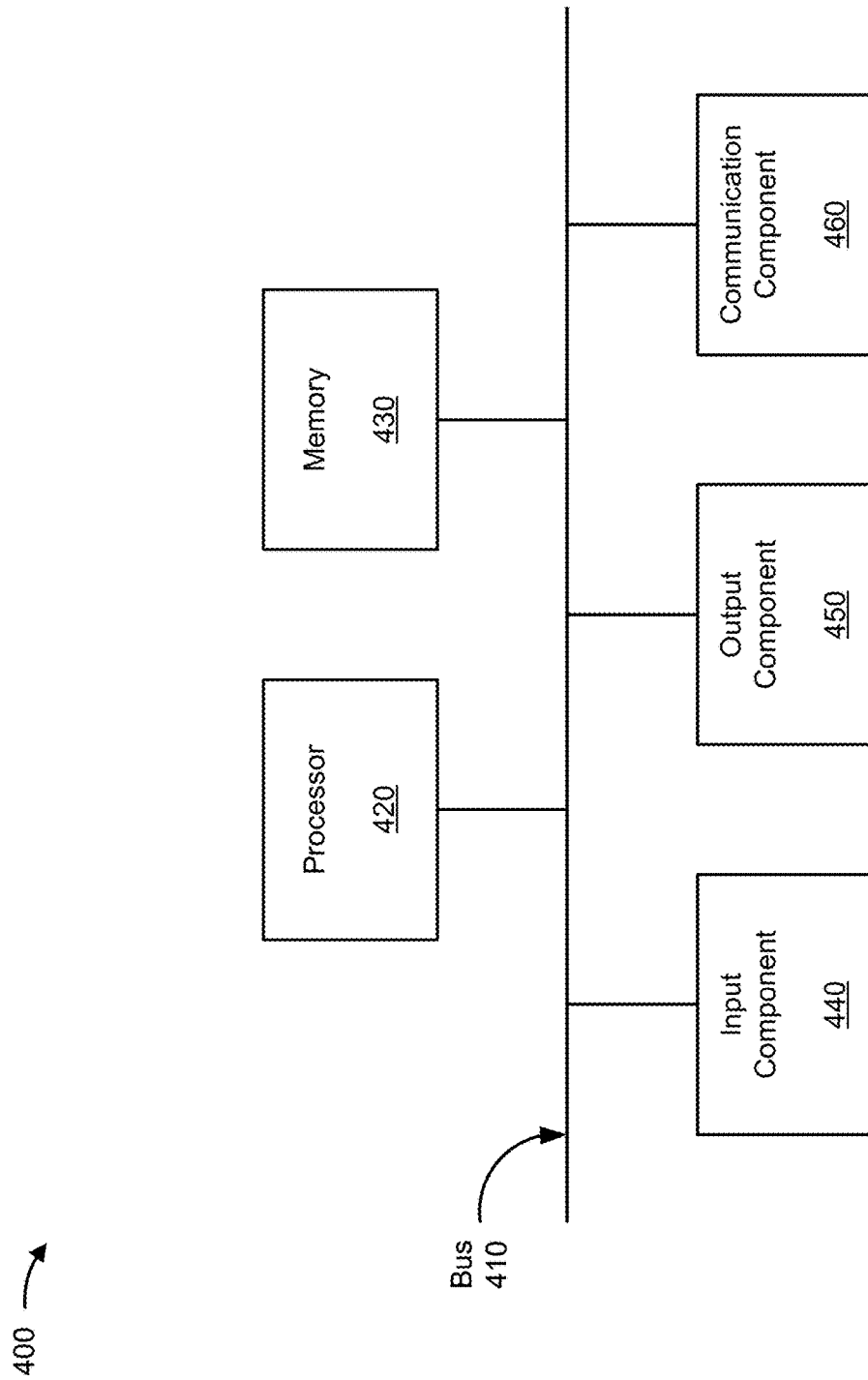
FIG. 4 is a diagram of example components of one or more devices of FIG. 3.

FIG. 4 is a diagram of example components of a device 400, which may correspond to the prediction system 301 and/or the surveillance system 330. In some implementations, the prediction system 301 and/or the surveillance system 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for determining incorrect predictions by machine learning models and generating explanations for predictions of the machine learning models. In some implementations, one or more process blocks of FIG. 5 may be performed by a device (e.g., the prediction system 301). In some implementations, one or more process blocks of FIG. 5 may be performed by another device or a group of devices separate from or including the device, such as a surveillance system (e.g., the surveillance system 330). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving surveillance video data captured by a surveillance system in a geographic location (block 510). For example, the device may receive surveillance video data captured by a surveillance system in a geographic location, as described above.

As further shown in FIG. 5, process 500 may include processing the surveillance video data, with a deep learning model, to identify objects in the geographic location (block 520). For example, the device may process the surveillance video data, with a deep learning model, to identify objects in the geographic location, as described above. In some implementations, processing the surveillance video data, with the deep learning model, to identify the objects in the geographic location includes processing the surveillance video data, with a you only look once object detection model, to identify the objects in the geographic location.

As further shown in FIG. 5, process 500 may include utilizing a segmentation guided attention network model with the objects to determine traffic density count data in the geographic location (block 530). For example, the device may utilize a segmentation guided attention network model with the objects to determine traffic density count data in the geographic location, as described above. In some implementations, utilizing the segmentation guided attention network model with the objects to determine the traffic density count data in the geographic location includes utilizing the segmentation guided attention network model, and a convolutional neural network as backbone, with the objects to determine traffic density count data in the geographic location.

As further shown in FIG. 5, process 500 may include processing the surveillance video data, with a regression analysis model, to derive traffic signal timing in the geographic location (block 540). For example, the device may process the surveillance video data, with a regression analysis model, to derive traffic signal timing in the geographic location, as described above.

As further shown in FIG. 5, process 500 may include utilizing a curriculum loss model with the objects to determine crowd count data in the geographic location (block 550). For example, the device may utilize a curriculum loss model with the objects to determine crowd count data in the geographic location, as described above.

As further shown in FIG. 5, process 500 may include processing the surveillance video data, with a deep learning video analytics model, to identify first events associated with emergency vehicles and accidents in the geographic location (block 560). For example, the device may process the surveillance video data, with a deep learning video analytics model, to identify first events associated with emergency vehicles and accidents in the geographic location, as described above.

As further shown in FIG. 5, process 500 may include processing the surveillance video data, with a classifier model and a deep network model, to identify second events associated with facial recognition in the geographical location (block 570). For example, the device may process the surveillance video data, with a classifier model and a deep network model, to identify second events associated with facial recognition in the geographical location, as described above. In some implementations, processing the surveillance video data, with the classifier model and the deep network model, to identify the second events associated with the facial recognition in the geographical location includes processing the surveillance video data, with a Haar cascade classifier model and a visual geometry group convolutional neural network model, to identify the second events associated with the facial recognition in the geographical location.

As further shown in FIG. 5, process 500 may include processing one or more of the objects, the traffic density count data, the crowd count data, the first events, or the second events, with a dynamic text-based explanation model, to generate a text-based explanation and/or a failure prediction for one or more of the regression analysis model, the deep learning model, the segmentation guided attention network model, the curriculum loss model, the deep learning video analytics model, the classifier model or the deep network model (block 580). For example, the device may process one or more of the objects, the traffic density count data, the crowd count data, the first events, or the second events, with a dynamic text-based explanation model, to generate a text-based explanation and/or a failure prediction for one or more of the regression analysis model, the deep learning model, the segmentation guided attention network model, the curriculum loss model, the deep learning video analytics model, the classifier model or the deep network model, as described above.

In some implementations, processing the one or more of the objects, the traffic density count data, the crowd count data, the first events, or the second events, with the dynamic text-based explanation model, to generate the text-based explanation and/or the failure prediction includes processing the one or more of the objects, the traffic density count data, the crowd count data, the first events, or the second events, with a local interpretable model-agnostic explanations model, to generate the text-based explanation and/or the failure prediction.

In some implementations, processing the one or more of the objects, the traffic density count data, the crowd count data, the first events, or the second events, with the dynamic text-based explanation model, to generate the text-based explanation and/or the failure prediction includes processing the one or more of the objects, the traffic density count data, the crowd count data, the first events, or the second events, with a randomized input sampling for explanation model, to generate the text-based explanation and/or the failure prediction.

In some implementations, processing the one or more of the objects, the traffic density count data, the crowd count data, the first events, or the second events, with the dynamic text-based explanation model, to generate the text-based explanation and/or the failure prediction includes processing the one or more of the objects, the traffic density count data, the crowd count data, the first events, or the second events, with a local interpretable model-agnostic explanations model, to generate a set of features, processing the set of features, with a visual geometry group convolutional neural network model, to generate a processed set of features, mapping the processed set of features to a vector space of a deep long short-term memory (LSTM) model, and generating the text-based explanation and/or the failure prediction via the deep LSTM model.

In some implementations, processing the one or more of the objects, the crowd count data, the first events, or the second events, with the dynamic text-based explanation model, to generate the failure prediction includes comparing a golden dataset of images with images of the surveillance video data utilized by the one or more of the regression analysis model, the deep learning model, the segmentation guided attention network model, the curriculum loss model, the deep learning video analytics model, the classifier model or the deep network model, identifying a set of images, associated with a failure by the one or more of the regression analysis model, the deep learning model, the segmentation guided attention network model, the curriculum loss model, the deep learning video analytics model, the classifier model or the deep network model, based on comparing the golden dataset of images with images of the surveillance video data, and generating the failure prediction based on the set of images.

In some implementations, the failure prediction includes identification of a set of images associated with a failure by the one or more of an object detection or classification model, the deep learning model, the segmentation guided attention network model, the curriculum loss model, the deep learning video analytics model, the classifier model or the deep network model. In some implementations, the failure prediction includes a textual explanation of a failure by the one or more of the regression analysis model, the deep learning model, the segmentation guided attention network model, the curriculum loss model, the deep learning video analytics model, the classifier model or the deep network model.

As further shown in FIG. 5, process 500 may include performing one or more actions based on the text-based explanation and/or the failure prediction (block 590). For example, the device may perform one or more actions based on the text-based explanation and/or the failure prediction, as described above. In some implementations, performing the one or more actions includes retraining one or more of the regression analysis model, the deep learning model, the segmentation guided attention network model, the curriculum loss model, the deep learning video analytics model, the classifier model or the deep network model based on the failure prediction. In some implementations, performing the one or more actions includes one or more of providing a text-based explanation of problem video frames associated with the failure prediction, or providing the problem video frames associated with the failure prediction. In some implementations, performing the one or more actions includes one or more of alerting authorities when the text-based explanation is associated with facial recognition of a person of interest, or providing the text-based explanation and/or the failure prediction for display.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, surveillance video data captured by a surveillance system in a geographic location;
   processing, by the device, the surveillance video data, with a deep learning model, to identify objects in the geographic location;
   utilizing, by the device, a segmentation guided attention network model with the objects to determine traffic density count data in the geographic location;
   processing, by the device, the segmented video frame data, with a regression analysis model, to derive traffic signal timing in the geographic location;
   utilizing, by the device, a curriculum loss model with the objects to determine crowd count data in the geographic location;
   processing, by the device, the surveillance video data, with a deep learning video analytics model, to identify first events associated with emergency vehicles and accidents in the geographic location;
   processing, by the device, the surveillance video data, with a classifier model and a deep network model, to identify second events associated with facial recognition in the geographical location;
   processing, by the device, one or more of the objects, the traffic density count data, the crowd count data, the first events, or the second events, with a dynamic text-based explanation model, to generate a layer-wise explanation and a text-based explanation and/or a failure prediction for one or more of the regression analysis model, the deep learning model, the segmentation guided attention network model, the curriculum loss model, the deep learning video analytics model, the classifier model or the deep network model; and
   performing, by the device, one or more actions based on the layer-wise explanation and the text-based explanation and/or the failure prediction.

2. The method of claim 1, wherein processing the surveillance video data, with the deep learning model, to identify the objects in the geographic location comprises:
   processing the surveillance video data, with a you only look once object detection model, to identify the objects in the geographic location;
   processing the object detection result, with VGG based feature matching approach between the objects in golden dataset and the predicted object by the deep learning model of object detection, to identify the most probable failure in online prediction by the model.

3. The method of claim 1, wherein utilizing the segmentation guided attention network model with the objects to determine the traffic density count data in the geographic location comprises:
   utilizing the segmentation guided attention network model, and a convolutional neural network as backbone, with the objects to determine traffic density count data in the geographic location.

4. The method of claim 1, wherein processing the surveillance video data, with the classifier model and the deep network model, to identify the second events associated with the facial recognition in the geographical location comprises:
   processing the surveillance video data, with a Haar cascade classifier model and a visual with the facial recognition in the geographical location.

5. The method of claim 1, wherein processing the one or more of the objects, the traffic density count data, the crowd count data, the first events, or the second events, with the layer-wise explanation model and the dynamic text-based explanation model, to generate the text-based explanation and/or the failure prediction comprises:
   processing the one or more of the objects, the traffic density count data, the crowd count data, the first events, or the second events, with a local interpretable model-agnostic explanations model, to generate the text-based explanation and/or the failure prediction.

6. The method of claim 1, wherein processing the one or more of the objects, the traffic density count data, the crowd count data, the first events, or the second events, with the dynamic text-based explanation model, to generate the text-based explanation and/or the failure prediction comprises:
   processing the one or more of the objects, the traffic density count data, the crowd count data, the first events, or the second events, with a randomized input sampling for explanation model, to generate the text-based explanation and/or the failure prediction.

7. The method of claim 1, wherein processing the one or more of the objects, the traffic density count data, the crowd count data, the first events, or the second events, with the dynamic text-based explanation model, to generate the text-based explanation and/or the failure prediction comprises:
   processing the one or more of the objects, the traffic density count data, the crowd count data, the first events, or the second events, with a local interpretable model-agnostic explanations model, to generate a set of features;
   processing the set of features, with a visual geometry group convolutional neural network model, to generate a processed set of features;
   mapping the processed set of features to a vector space of a deep long short-term memory (LSTM) model; and
   generating the text-based explanation and/or the failure prediction via the deep LSTM model.

8. A device, comprising:
   one or more memories; and
   one or more processors, coupled to the one or more memories, configured to:

receive surveillance video data captured by a surveillance system in a geographic location;
process the surveillance video data, with a deep learning model, to identify objects in the geographic location,
wherein the deep learning model includes an object detection model that divides images into a grid system;
utilize a segmentation guided attention network model with the objects to determine traffic density count data in the geographic location;
utilize a curriculum loss model with the objects to determine crowd count data in the geographic location;
process the surveillance video data, with a deep learning video analytics model, to identify first events associated with emergency vehicles and accidents in the geographic location;
process the surveillance video data, with a classifier model and a deep network model, to identify second events associated with facial recognition in the geographical location;
process one or more of the objects, the facial recognition, the object detection, the first events, or the second events, with a dynamic text-based explanation model, to generate a text-based explanation and/or a failure prediction for one or more of the regression analysis model, the deep learning model, the segmentation guided attention network model, the curriculum loss model, the deep learning video analytics model, the classifier model or the deep network model; and
perform one or more actions based on the text-based explanation and/or the failure prediction.

9. The device of claim 8, wherein the one or more processors, to process the one or more of the objects, the traffic density count data, the crowd count data, the first events, or the second events, with the dynamic text-based explanation model, to generate the failure prediction, are configured to:
compare a golden dataset of images with images of the surveillance video data utilized by the one or more of the regression analysis model, the deep learning model, the segmentation guided attention network model, the curriculum loss model, the deep learning video analytics model, the classifier model or the deep network model;
identify a set of images, associated with a failure by the one or more of the regression analysis model, the deep learning model, the segmentation guided attention network model, the curriculum loss model, the deep learning video analytics model, the classifier model or the deep network model, based on comparing the golden dataset of images with images of the surveillance video data; and
generate the failure prediction based on the set of images.

10. The device of claim 8, wherein the failure prediction includes identification of a set of images associated with a failure by the one or more of the regression analysis model, the deep learning model, the segmentation guided attention network model, the curriculum loss model, the deep learning video analytics model, the classifier model or the deep network model.

11. The device of claim 8, wherein the failure prediction includes a textual explanation of a failure by the one or more of the regression analysis model, the deep learning model, the segmentation guided attention network model, the curriculum loss model, the deep learning video analytics model, the classifier model or the deep network model.

12. The device of claim 8, wherein the one or more processors, to perform the one or more actions, are configured to:
retrain one or more of the regression analysis model, the deep learning model, the segmentation guided attention network model, the curriculum loss model, the deep learning video analytics model, the classifier model or the deep network model based on the failure prediction.

13. The device of claim 8, wherein the one or more processors, to perform the one or more actions, are configured to one or more of:
provide a text-based explanation of problem video frames associated with the failure prediction; or
provide the problem video frames associated with the failure prediction.

14. The device of claim 8, wherein the one or more processors, to perform the one or more actions, are configured to one or more of:
alert authorities when the text-based explanation is associated with facial recognition of a person of interest; or
provide the text-based explanation and/or the failure prediction for display.

15. A non-transitory computer-readable medium storing a set of instructions, the set of instructions comprising:
one or more instructions that, when executed by one or more processors of a device, cause the device to:
receive surveillance video data captured by a surveillance system in a geographic location;
process the surveillance video data, with a deep learning model, to identify objects in the geographic location;
utilize a segmentation guided attention network model, and a convolutional neural network as backbone, with the objects to determine traffic density count data in the geographic location;
utilize a curriculum loss model with the objects to determine crowd count data in the geographic location;
process the surveillance video data, with a deep learning video analytics model, to identify first events associated with emergency vehicles and accidents in the geographic location;
process the surveillance video data, with a classifier model and a deep network model, to identify second events associated with facial recognition in the geographical location;
process one or more of the objects, the traffic density count data, the crowd count data, the first events, or the second events, with a layer-wise explanation and a dynamic text-based explanation model, to generate a text-based explanation and/or a failure prediction for one or more of the regression analysis model, the deep learning model, the segmentation guided attention network model, the curriculum loss model, the deep learning video analytics model, the classifier model or the deep network model; and
perform one or more actions based on the text-based explanation and/or the failure prediction.

16. The non-transitory computer-readable medium of claim 15, wherein the one or more instructions, that cause the device to process the surveillance video data, with the classifier model and the deep network model, to identify the second events associated with the facial recognition in the geographical location, cause the device to:

process the surveillance video data, with a Haar cascade classifier model and a visual with the facial recognition in the geographical location.

17. The non-transitory computer-readable medium of claim 15, wherein the one or more instructions, that cause the device to process the one or more of the objects, the traffic density count data, the crowd count data, the first events, or the second events, with the layer-wise explanation and the dynamic text-based explanation model, to generate the text-based explanation and/or the failure prediction, cause the device to:
    process the one or more of the objects, the traffic density count data, the crowd count data, the first events, or the second events, with a local interpretable model-agnostic explanations model, to generate the text-based explanation and/or the failure prediction.

18. The non-transitory computer-readable medium of claim 15, wherein the one or more instructions, that cause the device to process the one or more of the objects, the traffic density count data, the crowd count data, the first events, or the second events, with the layer-wise explanation and the dynamic text-based explanation model, to generate the text-based explanation and/or the failure prediction, cause the device to:
    process the one or more of the objects, the traffic density count data, the crowd count data, the first events, or the second events, with a randomized input sampling for explanation model, to generate the text-based explanation and/or the failure prediction.

19. The non-transitory computer-readable medium of claim 15, wherein the one or more instructions, that cause the device to process the one or more of the objects, the traffic density count data, the crowd count data, the first events, or the second events, with the layer-wise explanation and the dynamic text-based explanation model, to generate the text-based explanation and/or the failure prediction, cause the device to:
    process the one or more of the objects, the traffic density count data, the crowd count data, the first events, or the second events, with a local interpretable model-agnostic explanations model, to generate a set of features;
    process the set of features, with a visual geometry group convolutional neural network model, to generate a processed set of features;
    map the processed set of features to a vector space of a deep long short-term memory (LSTM) model; and
    generate the text-based explanation and/or the failure prediction via the deep LSTM model.

20. The non-transitory computer-readable medium of claim 15, wherein the one or more instructions, that cause the device to process the one or more of the objects, the traffic density count data, the crowd count data, the first events, or the second events, with the dynamic text-based explanation model, to generate the failure prediction, cause the device to:
    compare a golden dataset of images with images of the surveillance video data utilized by the one or more of the regression analysis model, the deep learning model, the segmentation guided attention network model, the curriculum loss model, the deep learning video analytics model, the classifier model or the deep network model;
    identify a set of images, associated with a failure by the one or more of the regression analysis model, the deep learning model, the segmentation guided attention network model, the curriculum loss model, the deep learning video analytics model, the classifier model or the deep network model, based on comparing the golden dataset of images with images of the surveillance video data; and
    generate the failure prediction based on the set of images.

* * * * *